(12) United States Patent
Parekh et al.

(10) Patent No.: US 10,535,078 B2
(45) Date of Patent: Jan. 14, 2020

(54) METHOD FOR OPTIMIZING DYNAMIC BILLBOARD ADVERTISING USING TIME WEIGHTED LOCATION DATA

(71) Applicants: AT&T INTELLECTUAL PROPERTY I, LP, Atlanta, GA (US); AT&T MOBILITY II LLC, Atlanta, GA (US)

(72) Inventors: Biren Parekh, Cumming, GA (US); Ravishankar Doejode, Johns Creek, GA (US); Sheldon Kent Meredith, Roswell, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 409 days.

(21) Appl. No.: 15/057,543

(22) Filed: Mar. 1, 2016

(65) Prior Publication Data
US 2017/0255961 A1   Sep. 7, 2017

(51) Int. Cl.
*G06Q 30/00* (2012.01)
*G06Q 30/02* (2012.01)
*H04L 29/08* (2006.01)

(52) U.S. Cl.
CPC ..... *G06Q 30/0255* (2013.01); *G06Q 30/0261* (2013.01); *H04L 67/306* (2013.01)

(58) Field of Classification Search
None
See application file for complete search history.

(56) References Cited

U.S. PATENT DOCUMENTS

| 5,966,696 A | 10/1999 | Giraud |
| 7,209,807 B2 | 4/2007 | Smith et al. |

(Continued)

OTHER PUBLICATIONS

"Location based Advertising Deal Expands Brand Reach Across Mobile and Digital Placebased Screens", ScreenMedia Daily, screenmediadaily.com, accessed: Jan. 2016.

(Continued)

*Primary Examiner* — Eric R Netzloff
*Assistant Examiner* — Christopher Stroud
(74) *Attorney, Agent, or Firm* — Guntin & Gust, PLC; Jay Anderson

(57) ABSTRACT

Aspects of the subject disclosure may include, for example, determining a coverage area associated with an advertising display device, monitoring presence and motion of a plurality of communication devices with respect to the coverage area to determine a viewing time and a trajectory within the coverage area for each communication device, and associating each device with a user profile that comprises demographic data and preference data. Each user profile is assigned weighting factors based the viewing time and the trajectory for the associated device, thereby generating a weighted user profile for each of a plurality of users. The weighted user profiles are then aggregated to generate a time-dependent audience profile for the coverage area that is associated with an item of advertising content at the advertising display device. The audience profile is analyzed; a new item of advertising content can be selected and displayed. Other embodiments are disclosed.

20 Claims, 10 Drawing Sheets

(56) References Cited

U.S. PATENT DOCUMENTS

| | | |
|---|---|---|
| 7,495,631 B2 | 2/2009 | Bhakta et al. |
| 7,921,036 B1 | 4/2011 | Sharma et al. |
| 8,392,251 B2 | 3/2013 | Pradeep et al. |
| 8,471,701 B2 | 6/2013 | Yariv et al. |
| 9,082,134 B2 | 7/2015 | Gishen |
| 9,183,572 B2 | 11/2015 | Brubaker |
| 2006/0200378 A1* | 9/2006 | Sorensen ............. G06Q 10/063 705/7.29 |
| 2006/0212350 A1* | 9/2006 | Ellis ................... G06O 30/0242 705/14.41 |
| 2008/0004953 A1 | 1/2008 | Ma et al. |
| 2009/0265215 A1* | 10/2009 | Lindstrom ............. G06Q 30/02 705/7.32 |
| 2011/0004511 A1 | 1/2011 | Reich et al. |
| 2011/0035282 A1 | 2/2011 | Spatscheck et al. |
| 2011/0173054 A1* | 7/2011 | Kutaragi ................ G06Q 30/02 705/14.5 |
| 2012/0054028 A1 | 3/2012 | Tengler et al. |
| 2012/0150654 A1 | 6/2012 | Sathyanath et al. |
| 2013/0117121 A1 | 5/2013 | Raman et al. |
| 2013/0210455 A1 | 8/2013 | Carlsson et al. |
| 2013/0238378 A1 | 9/2013 | Connolly et al. |
| 2014/0052534 A1 | 2/2014 | Gandhi et al. |
| 2014/0070963 A1 | 3/2014 | DeLorean et al. |
| 2014/0129336 A1 | 5/2014 | Bailey et al. |
| 2014/0164125 A1 | 6/2014 | Taylor et al. |
| 2014/0279012 A1 | 9/2014 | Scofield et al. |
| 2014/0337123 A1 | 11/2014 | Nuernberg |
| 2014/0358685 A1 | 12/2014 | Want |
| 2014/0379477 A1* | 12/2014 | Sheinfeld ........... G06Q 30/0251 705/14.58 |
| 2015/0149285 A1 | 5/2015 | Schroeter |
| 2015/0193826 A1 | 7/2015 | Canoy |
| 2015/0242969 A1* | 8/2015 | Pallas ................... G06Q 50/06 705/39 |

OTHER PUBLICATIONS

"Vector Media Adds Beacons to Transit Advertising Network", ScreenMedia Daily, screenmediadaily.com, accessed: Jan. 2016.

Garzon, Sandro R. et al., "Geofencing 2.0: Taking Location-based Notifications to the Next Level", UbiComp'14, Sep. 13-17, 2014, Seattle, WA, USA.

Girish, Devika , "Beacons and Digital Signage: The New Power Couple in Brand Advertising", baconstac™, blog.beaconstac.com, Jul. 29, 2015.

Pongpaichet, Siripen et al., "Situation Fencing: Making Geo-Fencing Personal and Dynamic", In Proceedings of the 1st ACM international workshop on Personal data meets distributed multimedia, pp. 3-10. ACM, 2013.

Romanov, Alex , "Proximity marketing: Merging the digital and physical worlds (Commentary)", Digital Signage Today, digitalsignagetoday.com, Oct. 5, 2012.

* cited by examiner

100

300

400

500

800

METHOD FOR OPTIMIZING DYNAMIC BILLBOARD ADVERTISING USING TIME WEIGHTED LOCATION DATA

FIELD OF THE DISCLOSURE

The subject disclosure relates to a system and method for optimizing advertising, particularly electronic billboard advertising.

BACKGROUND

An electronic billboard can be controlled so that the advertising content displayed on the billboard reflects the preferences of the billboard's audience, based on profiles of users of communication devices located in the vicinity of the billboard.

BRIEF DESCRIPTION OF THE DRAWINGS

Reference will now be made to the accompanying drawings, which are not necessarily drawn to scale, and wherein.

DETAILED DESCRIPTION

Figure 1:
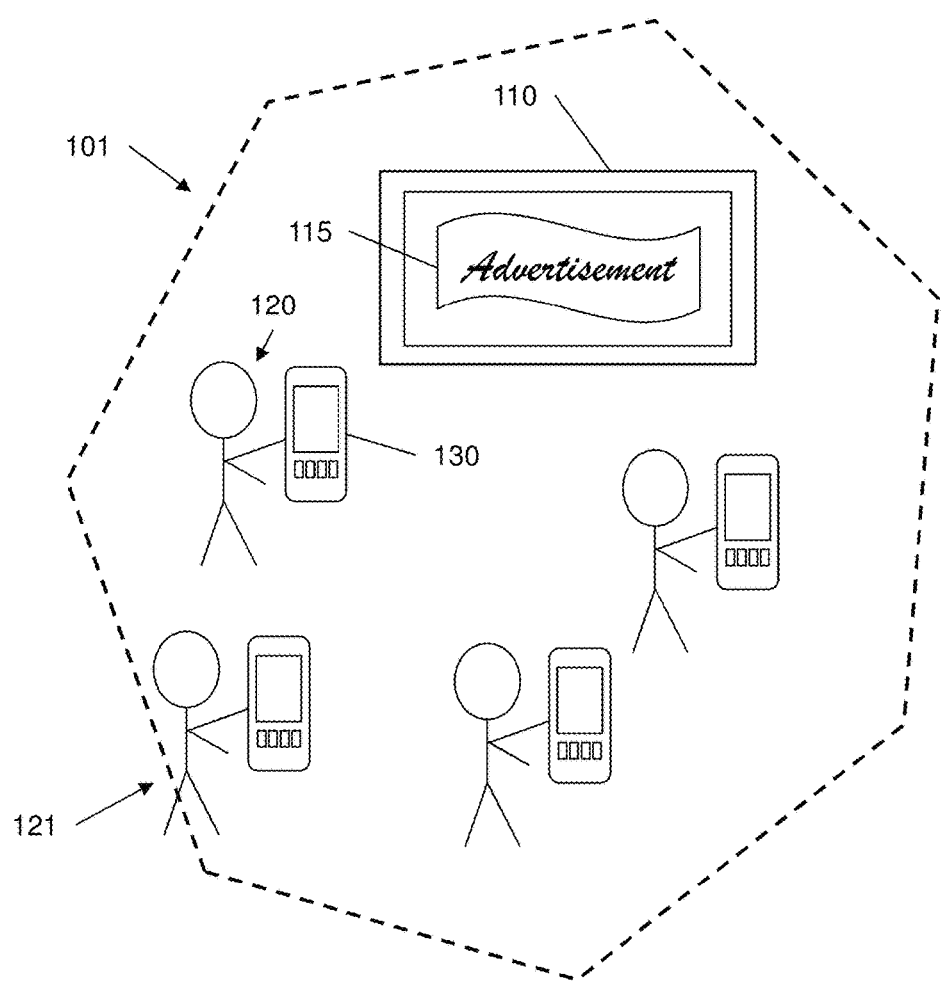
FIG. 1 schematically illustrates a coverage area for an electronic billboard having advertising content and having viewers using communication devices.

The subject disclosure describes, among other things, illustrative embodiments for an electronic billboard system in which advertising content is selected based on audience user profiles, and those profiles are weighted according to various factors, one of which may be a length of time a member of the audience has been present in the vicinity of the billboard. Other embodiments are described in the subject disclosure.

One or more aspects of the subject disclosure include a device comprising a processor and a memory that stores executable instructions. The instructions, when executed by the processor, facilitate performance of operations. The operations comprise determining a coverage area associated with an advertising display device, and monitoring presence and motion of a plurality of communication devices with respect to the coverage area to determine a viewing time and a trajectory within the coverage area for each communication device; the viewing time comprises a period that each of the plurality of communication devices is within the coverage area. The operations also comprise associating each communication device with a user profile, where the user profile comprises demographic data and preference data for a user, and assigning each user profile a first weighting factor and a second weighting factor based respectively on the viewing time and the trajectory for the associated communication device. The first weighting factor decreases with increasing viewing time and the second weighting factor increases according to coincidence with a direction toward the advertising display device. A weighted user profile is thereby generated for each of a plurality of users. The operations further comprise aggregating a plurality of weighted user profiles corresponding to the plurality of users to generate a time-dependent audience profile for the coverage area that is associated with an item of advertising content at the advertising display device; analyzing the audience profile; selecting a new item of advertising content based on the analyzing; and transmitting information based on the selecting to an advertising manager to cause display of the new item of advertising content at the advertising display device.

One or more aspects of the subject disclosure include a method comprising determining, by a device comprising a processor, a coverage area associated with an advertising display device, and monitoring presence and motion of a plurality of communication devices with respect to the coverage area to determine a viewing time and a trajectory within the coverage area for each communication device; the viewing time comprises a period that each of the plurality of communication devices is within the coverage area. The method also comprises associating each communication device with a user profile, the user profile comprising demographic data and preference data for a user, and assigning each user profile a first weighting factor and a second weighting factor based respectively on the viewing time and the trajectory for the associated communication device, thereby generating a weighted user profile for each of a plurality of users; the first weighting factor decreases with increasing viewing time and the second weighting factor increases according to coincidence with a direction toward the advertising display device. The method further comprises aggregating a plurality of weighted user profiles corresponding to the plurality of users to generate a time-dependent audience profile for the coverage area that is associated with an item of advertising content at the advertising display device; analyzing the audience profile; and selecting a new item of advertising content based on the analyzing.

One or more aspects of the subject disclosure include a machine-readable storage medium comprising executable instructions that, when executed by a processor, facilitate performance of operations. The operations comprise determining a coverage area associated with an advertising display device, monitoring presence and motion of a plurality of communication devices with respect to the coverage area to determine a viewing time and a trajectory within the coverage area for each communication device; the viewing time comprises a period that each of the plurality of communication devices is within the coverage area. The operations also comprise associating each communication device with a user profile that comprises demographic data and preference data for a user. The operations also comprise assigning each user profile a first weighting factor and a second weighting factor based respectively on the viewing time and the trajectory for the associated communication device, thereby generating a weighted user profile for each of a plurality of users. The operations further comprise aggregating a plurality of weighted user profiles corresponding to the plurality of users to generate a time-dependent audience profile for the coverage area that is associated with an item of advertising content at the advertising display device; analyzing the audience profile; and selecting a new item of advertising content based on the analyzing.

FIG. 1 schematically illustrates an arrangement 100 of a billboard advertisement and potential viewers of the advertisement, according to an embodiment of the disclosure. In this embodiment, billboard 110 comprises an electronic display that is linked to an advertising management system (not shown in FIG. 1) for presenting advertising content 115. Billboard 110 may be regarded as dynamic advertising, since the advertising management system can change the content 115 dynamically, for example according to the time of day or according to known demographics and preferences of viewers in the vicinity.

Billboard 110 is located within a coverage area 101 that has a boundary defined by geographic coordinates (such a boundary is sometimes referred to as a geofence). A user 120 of a communication device 130, if located within the coverage area, is considered to belong to the viewing audience of the billboard 110 and its advertising content 115. As shown in FIG. 1, there are typically multiple persons within the coverage area, each having an associated communication device.

Each device 130 communicates with a base station or server via a communication network that includes a geolocation function (not shown in FIG. 1). Accordingly, the locations and identities of users 120 in the coverage area may be monitored. In this embodiment, the presence and location of users 120 is constantly monitored; the trajectory of motion of each user within the coverage area thus can be obtained from the changing location of the user's device. The group of users within the coverage area (that is, the audience for the advertising content) also changes with time, for example by the arrival of a user 121 into the coverage area. Each user 120 has an associated user profile including (for example) demographic data and product preference data.

The audience for the advertising content thus has an overall profile (including for example aggregated demographics and consumer preferences of the users) that is time-dependent. In some situations (for example, if the coverage area includes a workplace with generally the same population each weekday) the audience profile has a historical pattern that permits prediction of a future profile. Analysis of the time-dependent audience profile can be used to select advertising content of interest to the current viewers in the coverage area.

In general, the audience profile is constructed by aggregating the individual profiles of the users 120. The individual profiles can be assigned different weights based on a number of factors, as detailed below.

Figure 2:
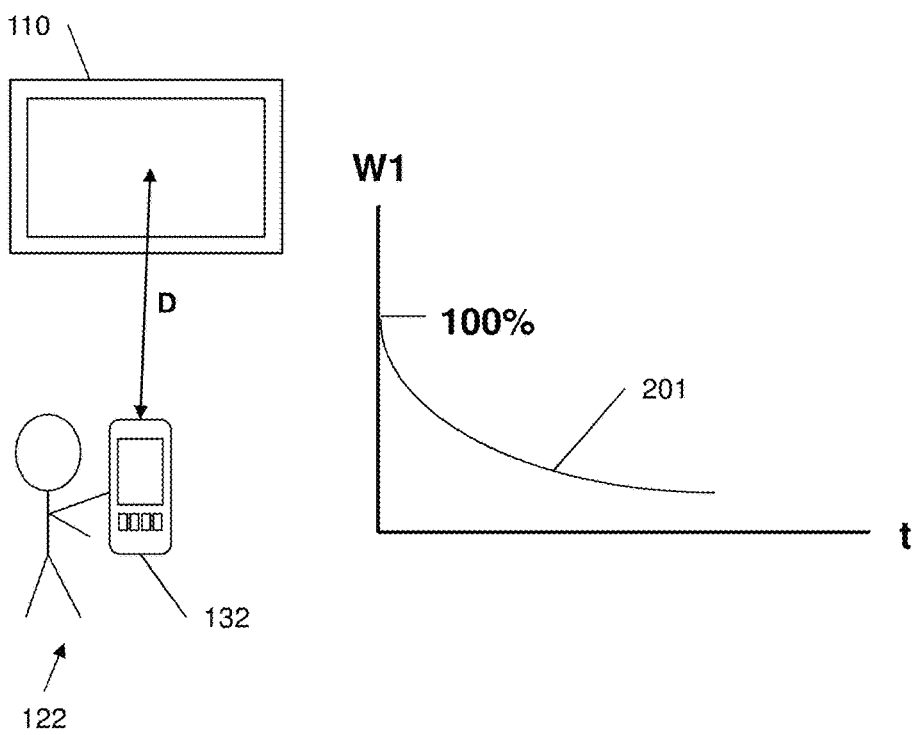
FIG. 2 illustrates a weighting factor for a user profile that varies with viewing time within the coverage area, in accordance with an embodiment of the disclosure.

FIG. 2 schematically illustrates assigning a weighting factor W1 to the profile of a user 122 associated with device 132, according to an embodiment 200 of the disclosure. The location of the device 132 within the coverage area can be determined by geolocation. Accordingly, the length of time that the user has been in the coverage area, and thus exposed to the advertising content, can be determined. In this embodiment, weighting factor W1 corresponds to the user's interest in the advertising content, which can be modeled, for example, as a decaying exponential function of time. Weighting factor W1 thus varies with time from 100%, when the user is newly arrived in the coverage area and thus has a fresh view of the advertising content, diminishing as shown by graph 201. If new advertising content is displayed so that every user in the coverage area has a fresh view, W1 is reset to 100%.

In an embodiment, user 122 has a work location in the coverage area, and thus can be exposed to the advertising content on successive days. Historical data regarding the user's movements can be used to adjust the weighting factor. In this instance, if new content is displayed on the billboard, W1 would initially have a value of 100% and then diminish during the workday until the user leaves the coverage area. Upon the user's entry into the coverage area the next morning, W1 would have a value of less than 100%, and again diminish during that workday. More generally, a profile for a user with repeated and relatively stationary presence will have a lower W1 factor than a profile for a user entering the coverage area for the first time. Accordingly, in this embodiment user 122 may repeatedly and predictably enter the coverage area and have a profile with a W1 factor near zero after a few days of exposure to the advertising content.

In another embodiment, W1 can depend on the user's distance D from the billboard, in addition to depending on time. For example, if user 122 moves toward the billboard after new content is displayed, W1 may remain near 100% for a longer period of time than if the user remained stationary, consistent with the user showing sustained interest in the advertising content.

Figure 3:
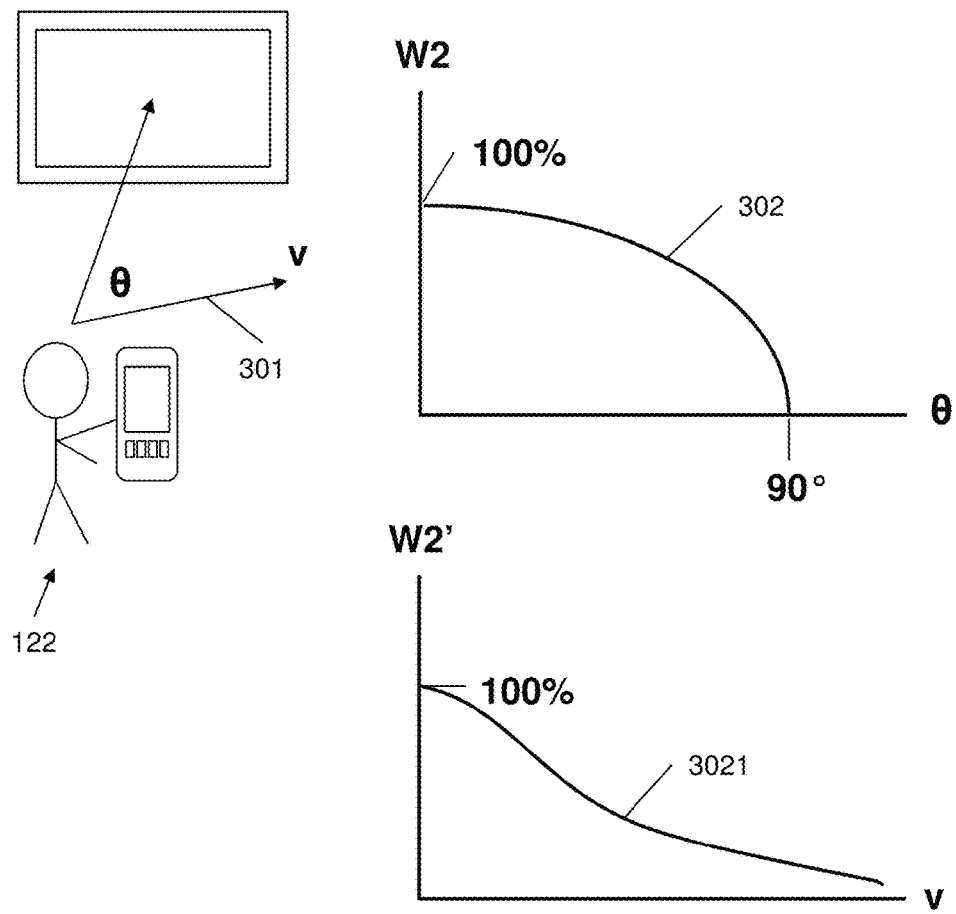
FIG. 3 illustrates a weighting factor for a user profile that varies with trajectory within the coverage area, in accordance with an embodiment of the disclosure.

Other weighting factors for a user profile can depend on the trajectory of the user in the coverage area. FIG. 3 schematically illustrates assigning weighting factors according to the velocity and direction of motion of the user (inferred from the monitored motion of the user's device), according to an embodiment 300 of the disclosure. In this embodiment, the trajectory 301 is given by velocity v and direction at an angle θ relative to a direction directly toward the billboard. In this embodiment, weighting factor W2 depends on the direction of travel, and can be modeled, for example, as cos θ, decreasing to zero at 90° (as shown by graph 302), while weighting factor W2' depends on the velocity v, and can be modeled, for example, as a nonlinear decreasing function of v (as shown by graph 3021). A combined weighting factor W2*W2' based on the trajectory thus would be near 100% for a user slowly moving straight toward the advertising display, and near zero for a user hurrying past the billboard with the display off to one side.

Figure 4:
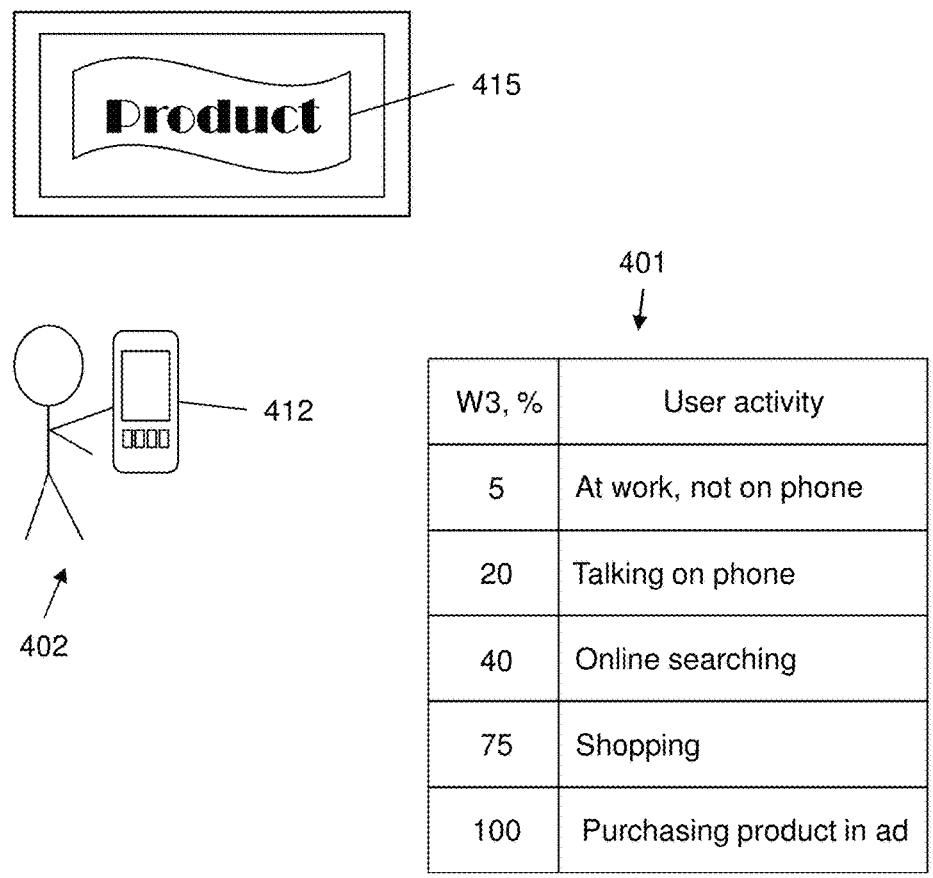
FIG. 4 illustrates a weighting factor for a user profile that varies with user activities, in accordance with an embodiment of the disclosure.

In another embodiment, a weighting factor can be applied to a user profile depending on a type of activity of the user. FIG. 4 schematically illustrates assigning a weighting factor W3 to the profile of a user 402, according to an embodiment 400 of the disclosure. In this embodiment, different user activities can be tracked or inferred from usage of device 412 associated with user 402. Each of these activities is then associated with a value of weighting factor W3. Examples of activities are shown in list 401. In this example, if the user is at his workplace and not using the device, W3 can be assigned a value of 5%. However, if the user is shopping (and thus is more likely to be influenced by advertising content 415 displayed on the billboard), W3 can be assigned a value of 75%. If the user purchases the advertised product, W3 can be assigned a value of 100%. In a further embodiment, W3 can be time-dependent, with future values of W3 influenced by current activities. For example, if the user performs a search for the advertised product, W3 might be assigned a value of 40% until the search concludes, with W3 diminishing linearly to 0% over the next four hours, consistent with the product being no longer fresh in the user's mind.

Figure 5:
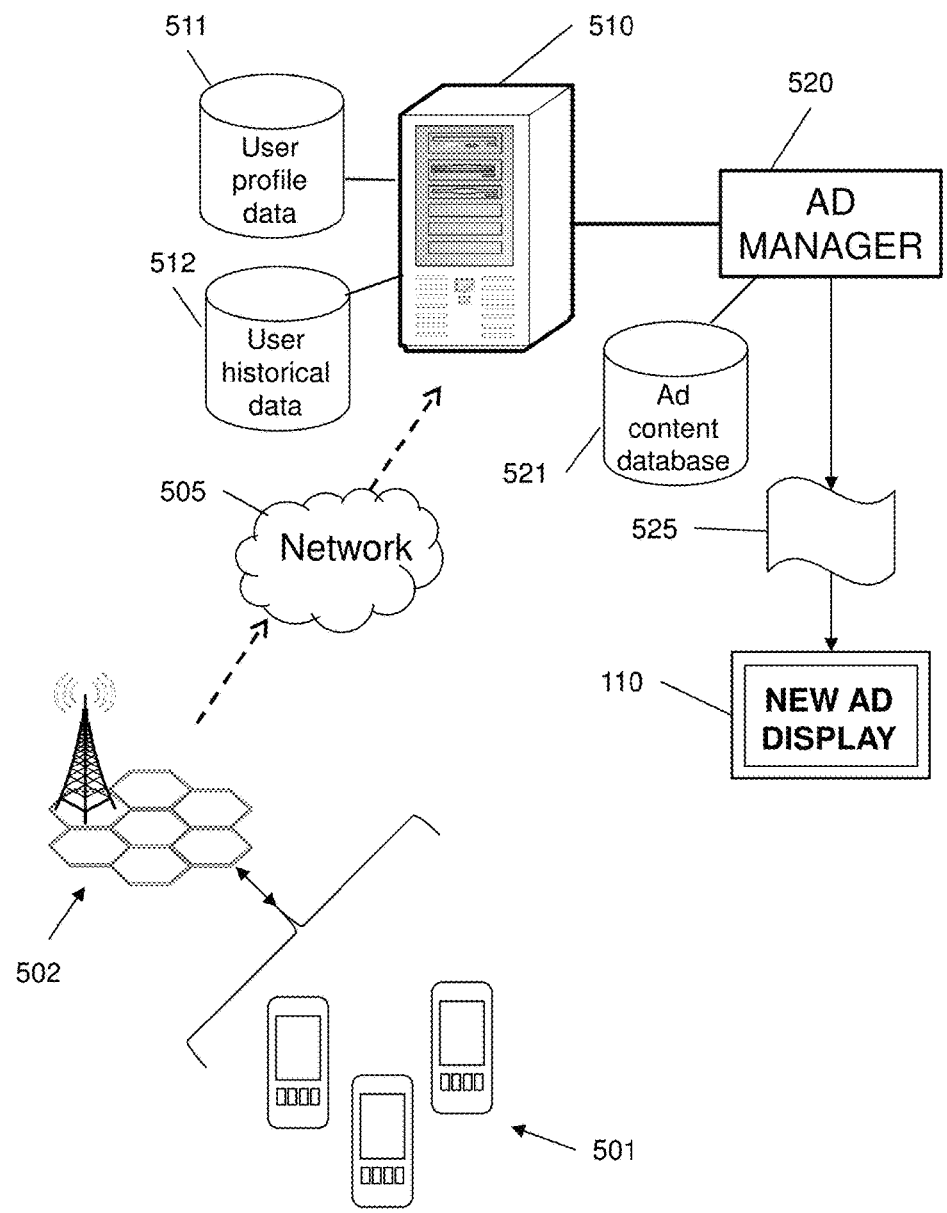
FIG. 5 schematically illustrates a system for monitoring and analyzing user interaction with the billboard of FIG. 1 by applying the weighting factors of FIGS. 2-4, in accordance with an embodiment of the disclosure.

FIG. 5 schematically illustrates a system 500 for monitoring and analyzing user interaction with the billboard of FIG. 1 by applying the weighting factors of FIGS. 2-4, in accordance with an embodiment of the disclosure. As shown in FIG. 5, communication devices 501 (belonging to users currently within the coverage area 101 of the billboard advertisement) communicate with a base station 502, which in turn is connected to a network 505. A geolocation and profile analysis system, operating on a server 510, receives data via the network regarding the location and movement of devices 501. In this embodiment, the system maintains databases 511, 512 including user demographic and preference profiles and historical data regarding user location and movement. The system computes weighting factors based on users' presence, movement, and activities while in the coverage area 101 of billboard 110, and applies those weighting factors to construct an aggregated, time-dependent profile for the audience that is currently exposed to advertising content 115.

The system then can analyze the audience profile with respect to the advertising content, and determine whether new content should be presented. In this embodiment, the system communicates with an advertising manager 520 that maintains a database 521 of advertising content. The system can query the advertising manager for content that is better suited to the current or predicted audience profile. The advertising manager transmits the new content 525 for display at the billboard 110. In an embodiment, the advertising manager maintains a list of billboards with a geofence specified for each billboard, and may maintain a different advertising content database for each billboard.

Figure 6:
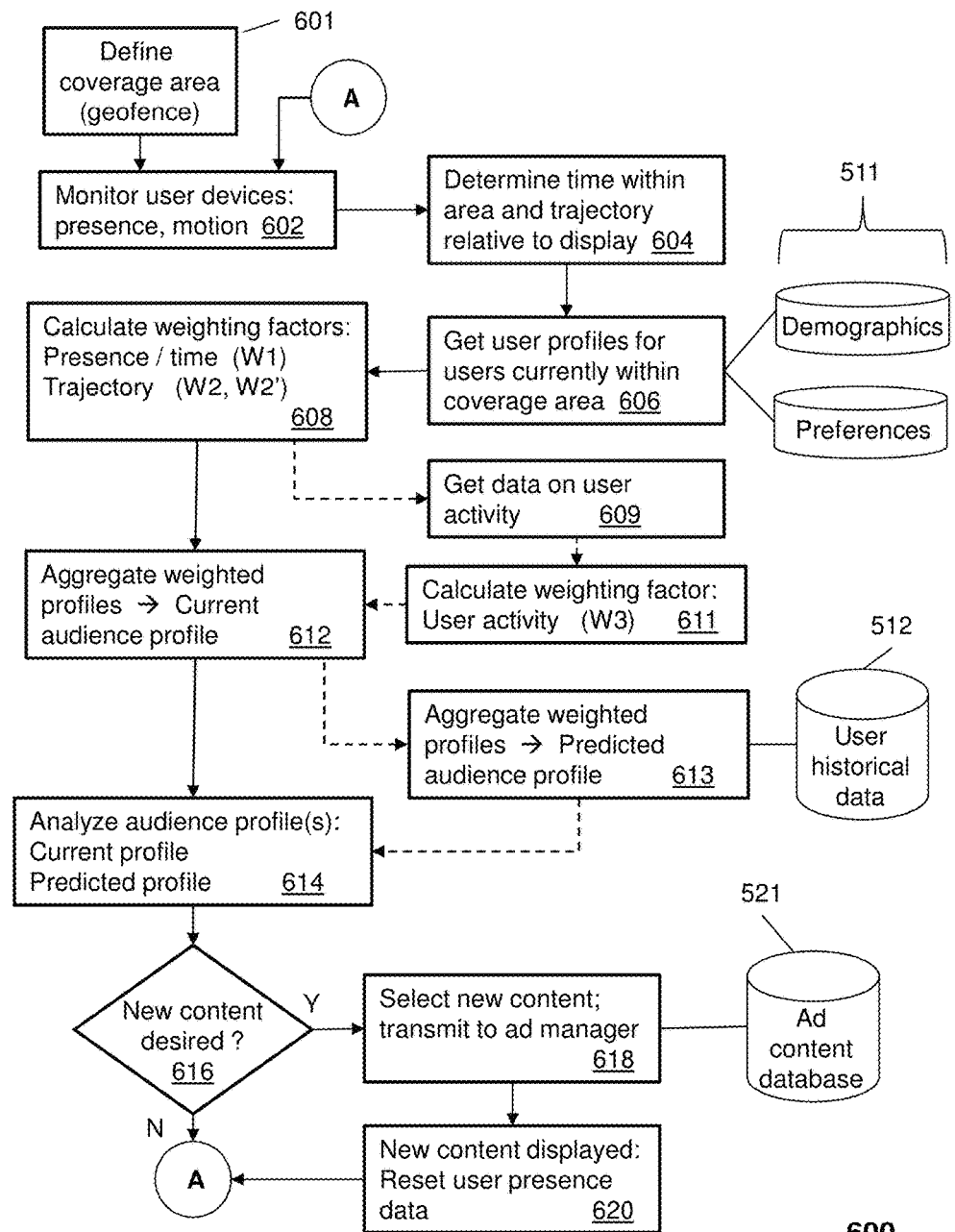
FIG. 6 is a flowchart illustrating a method for analyzing billboard advertising audience profiles, in accordance with an embodiment of the disclosure.

FIG. 6 is a flowchart illustrating a method 600 for computing weighting factors for user profiles and analyzing audience profiles, in accordance with an embodiment of the disclosure. A monitoring and analysis system determines an appropriate coverage area (geofence) for a billboard (step 601); this may be done by constructing a map of the general area in front of the billboard and evaluating distances and quality of sightlines for various locations in that area. Alternatively, the geofence may be predetermined based on the location of the billboard; the system may then retrieve coordinates for the geofence from the advertising manager.

User devices within the coverage area are monitored (step 602) to obtain the time-dependent locations and identities of users associated with the devices. For each user, the length of time present in the coverage area (viewing time) and the trajectory relative to the advertising display are determined (step 604). In addition, a profile is retrieved for each user currently within the coverage area (step 606); in general, the profile includes both demographic data and consumer preferences (e.g. favorite products).

The system calculates weighting factor W1 based on the viewing time of the user's device within the coverage area, and weighting factors W2 and W3 based on the trajectory of the device (step 608). The system may also obtain data regarding user activity (either current or recent) in step 609, and then calculate weighting factor W3 (step 611).

The weighted profiles for the users in the coverage area are then aggregated to yield a current audience profile for the advertising content (step 612). The current profile can also be aggregated with historical data regarding users' movements, to generate a predicted audience profile (step 613).

The audience profile is then analyzed with respect to the current advertising content (step 614). If it is decided (applying predetermined criteria) that the advertising content is not suitable for the audience, new content may be ordered (step 616). New content is then selected from the advertising content database; the advertising manager is directed to display the new content (step 618). When the new content is displayed (step 620), every user in the coverage area becomes a new viewer, and the user viewing time weighting factor W1 is reset to 100%.

While for purposes of simplicity of explanation, the respective processes are shown and described as a series of blocks in FIG. 6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 7:
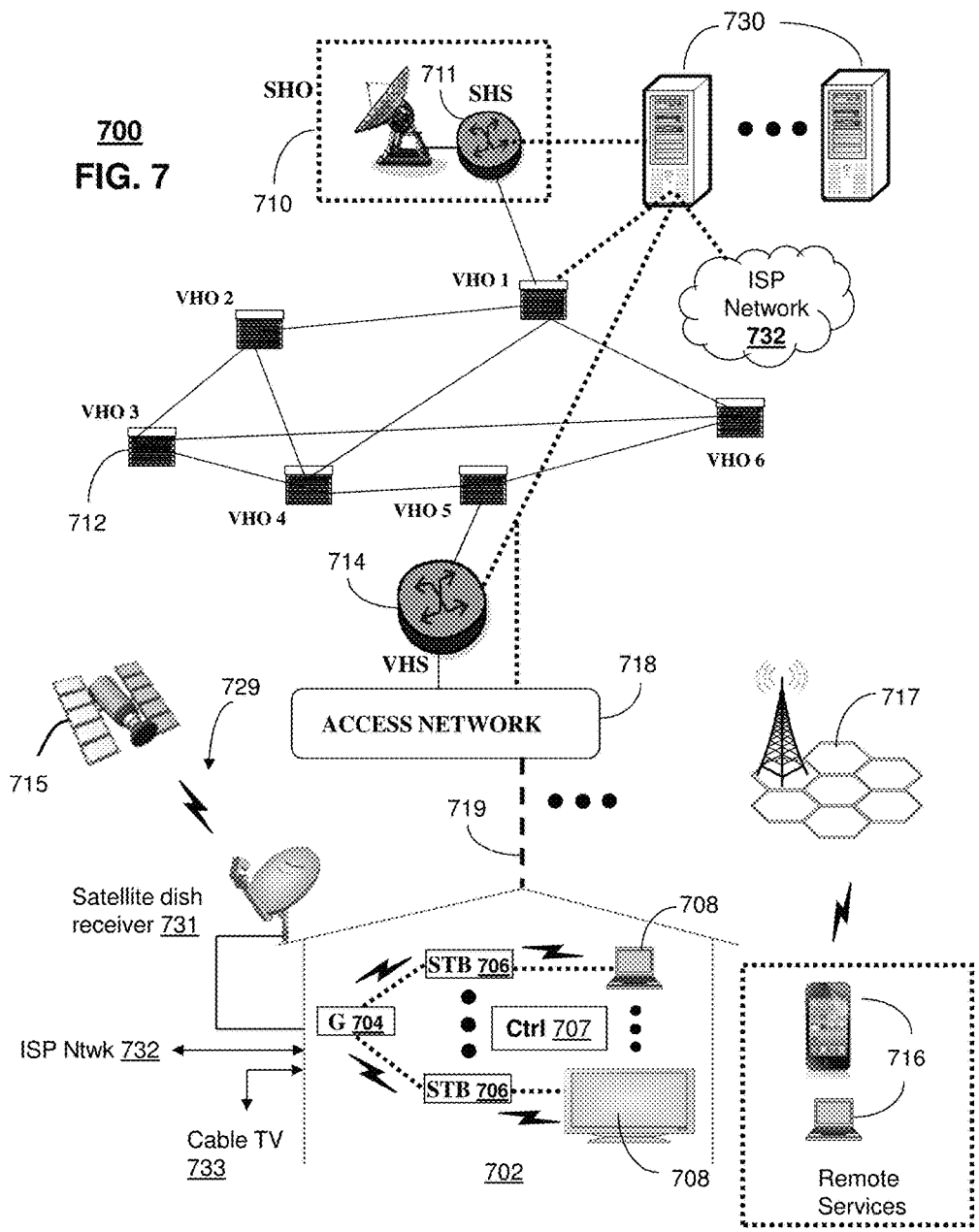
FIGS. 7-8 depict illustrative embodiments of communication systems that provide media services to users of communication devices as shown in FIGS. 1-3.

FIG. 7 depicts an illustrative embodiment of a first communication system 700 for delivering media content. The communication system 700 can represent an Internet Protocol Television (IPTV) media system. Communication system 700 can be overlaid or operably coupled with system 500 of FIG. 5 as another representative embodiment of communication system 700. For instance, one or more devices illustrated in the communication system 700 of FIG. 7 can perform a method comprising determining a coverage area associated with an advertising display device; monitoring presence and motion of a plurality of communication devices with respect to the coverage area to determine a viewing time and a trajectory within the coverage area for each communication device; associating each communication device with a user profile, the user profile comprising demographic data and preference data for a user, and assigning each user profile a first weighting factor and a second weighting factor based respectively on the viewing time and the trajectory for the associated communication device, thereby generating a weighted user profile for each of a plurality of users, where the first weighting factor decreases with increasing viewing time and the second weighting factor increases according to coincidence with a direction toward the advertising display device; aggregating a plurality of weighted user profiles corresponding to the plurality of users to generate a time-dependent audience profile for the coverage area that is associated with an item of advertising content at the advertising display device; analyzing the audience profile; and selecting a new item of advertising content based on the analyzing.

The IPTV media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716. In particular, computing device 730 can include the geolocation and profile analysis system as shown in FIG. 5.

Communication system 700 can also provide for all or a portion of the computing devices 730 to function as a device performing monitoring presence and motion of communication devices, (herein referred to as computing device 730). The computing device 730 can use computing and communication technology to perform locating and monitoring of communication devices in coverage area 101, which can include among other things, determining the viewing time and trajectory of a particular device, as described above with reference to method 600. For instance, functions of computing device 730 can be similar to the functions described for server 510. The media processors 706 and wireless communication devices 716 can be provisioned with software functions to utilize the services of computing device 730.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
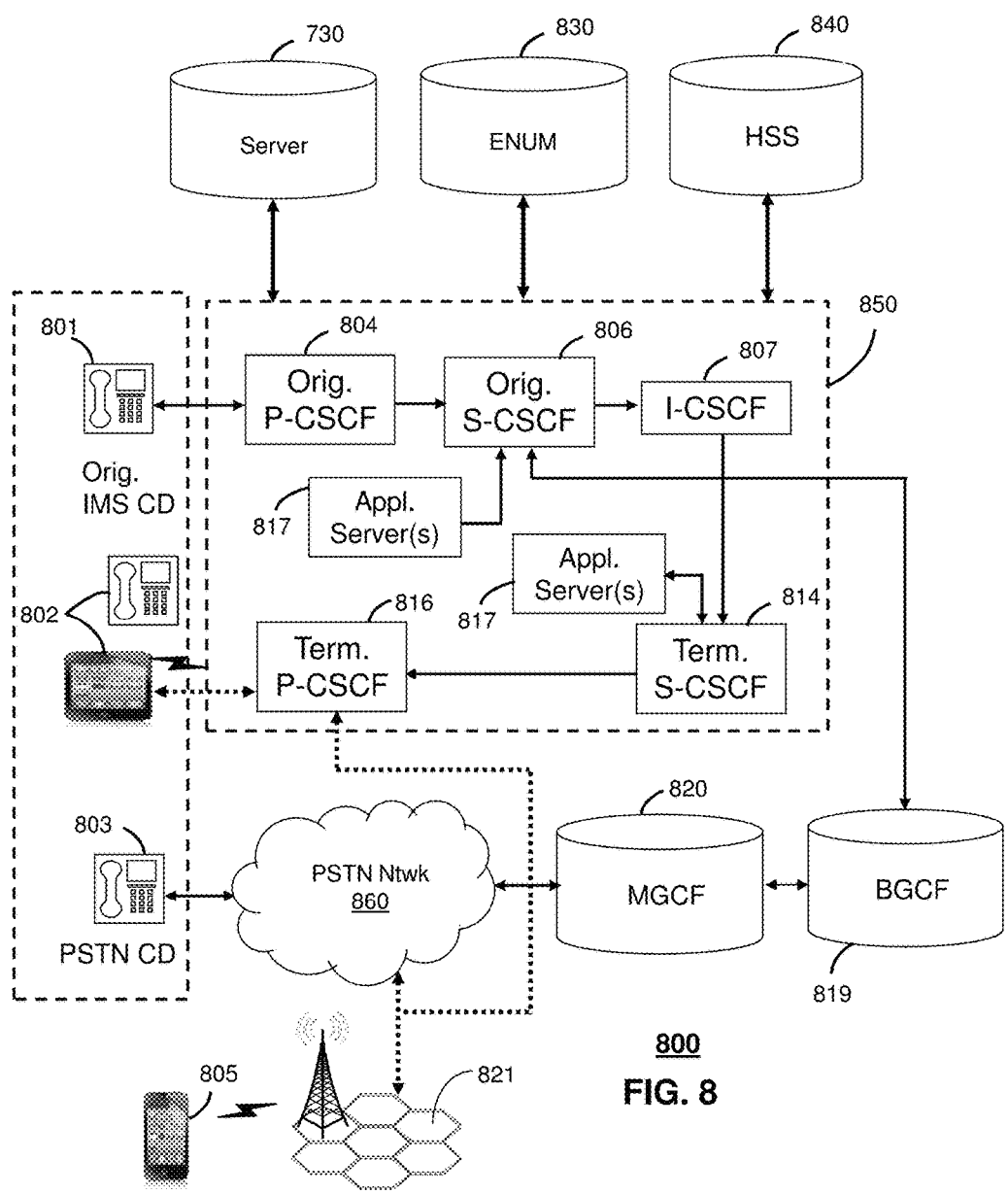

FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with system 500 of FIG. 5, and communication system 700 as another representative embodiment of communication system 700. In particular, system 700 can include a machine-readable storage medium comprising executable instructions that, when executed by a processor, facilitate performance of operations; the operations comprise determining a coverage area associated with an advertising display device; monitoring presence and motion of a plurality of communication devices with respect to the coverage area to determine a viewing time and a trajectory within the coverage area for each communication device; associating each communication device with a user profile that comprises demographic data and preference data for a user; assigning each user profile a first weighting factor and a second weighting factor based respectively on the viewing time and the trajectory for the associated communication device, thereby generating a weighted user profile for each of a plurality of users; aggregating a plurality of weighted user profiles corresponding to the plurality of users to generate a time-dependent audience profile for the coverage area that is associated with an item of advertising content at the advertising display device; analyzing the audience profile; and selecting a new item of advertising content based on the analyzing.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the multimedia and Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The computing device 730 of FIG. 7 can be operably coupled to communication system 800 for purposes similar to those described above. Computing device 730 can provide services to the CDs 801, 802, 803 and 805 of FIG. 8. CDs 801, 802, 803 and 805 can be adapted with software to utilize the services of the computing device 730, in accordance with method 600 of FIG. 6. Computing device 730 can also be an integral part of the application server(s) 817 and adapted to the operations of the IMS network 850.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 9:
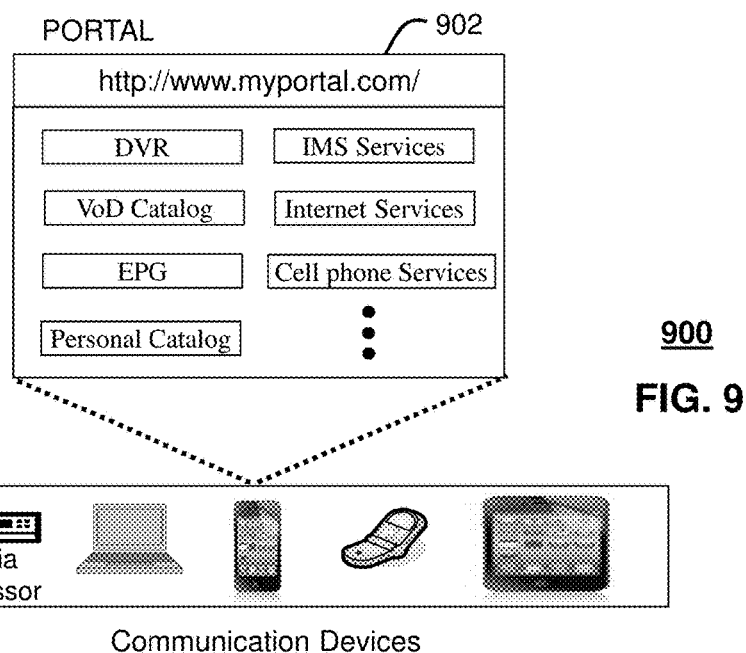
FIG. 9 depicts an illustrative embodiment of a web portal for interacting with the communication systems of FIGS. 6-7.

FIG. 9 depicts an illustrative embodiment of a web portal 902 of a communication system 900. Communication system 900 can be overlaid or operably coupled with system 500 of FIG. 5, communication system 700, and/or communication system 800 as another representative embodiment of system 500, communication system 700, and/or communication system 800. The web portal 802 can be used for managing services of system 500 and communication systems 700-800. A web page of the web portal 902 can be accessed by a Uniform Resource Locator (URL) with an Internet browser using an Internet-capable communication device. The web portal 902 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 902 can also be used for provisioning IMS services described earlier, provisioning Internet services, provisioning cellular phone services, and so on.

The web portal 902 can further be utilized to manage and provision software applications and adapt those applications as may be desired by subscribers and/or service providers of system 500 and communication systems 700-800. For instance, users of the services provided by computing device 730 can log into their on-line accounts and provision the servers 110 or server 730 with user profiles and weighting factors for user profiles, provide contact information to server 730 to enable it to communicate with devices shown in FIGS. 1-5, and so on. Service providers can log onto an administrator account to provision, monitor and/or maintain system 500 or server 730.

Figure 10:
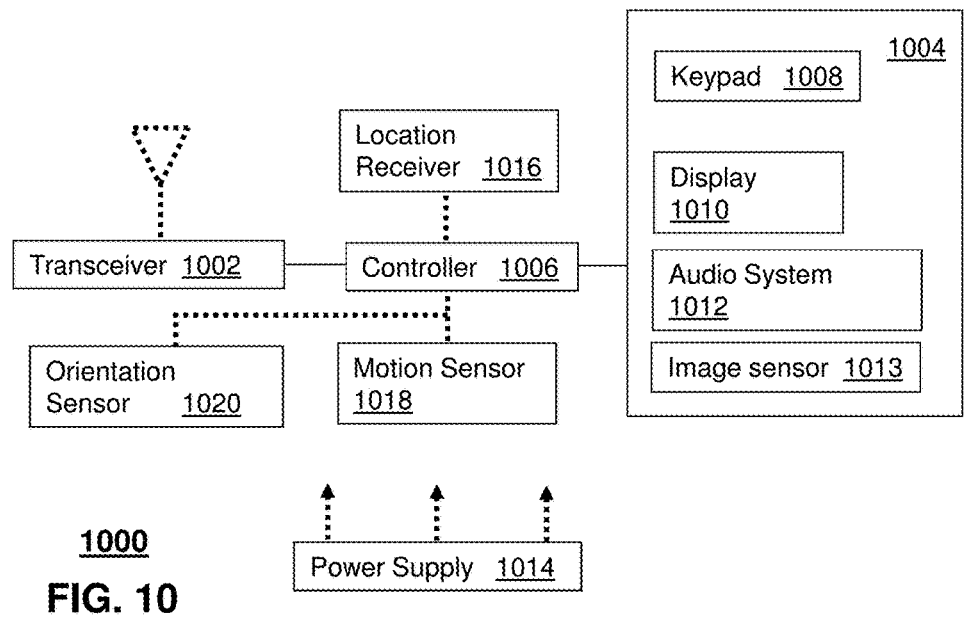
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIGS. 5, 7 and 8 and can be configured to perform portions of method 600 of FIG. 6.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of devices of FIGS. 1-4, the media processor 706, the media devices 708, or the portable communication devices 716 of FIG. 7, as well as the IMS CDs 801-702 and PSTN CDs 803-705 of FIG. 8. It will be appreciated that the communication device 1000 can also represent other devices that can operate in system 500, and communication systems 700-800 of FIGS. 7-8 such as a gaming console and a media player.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
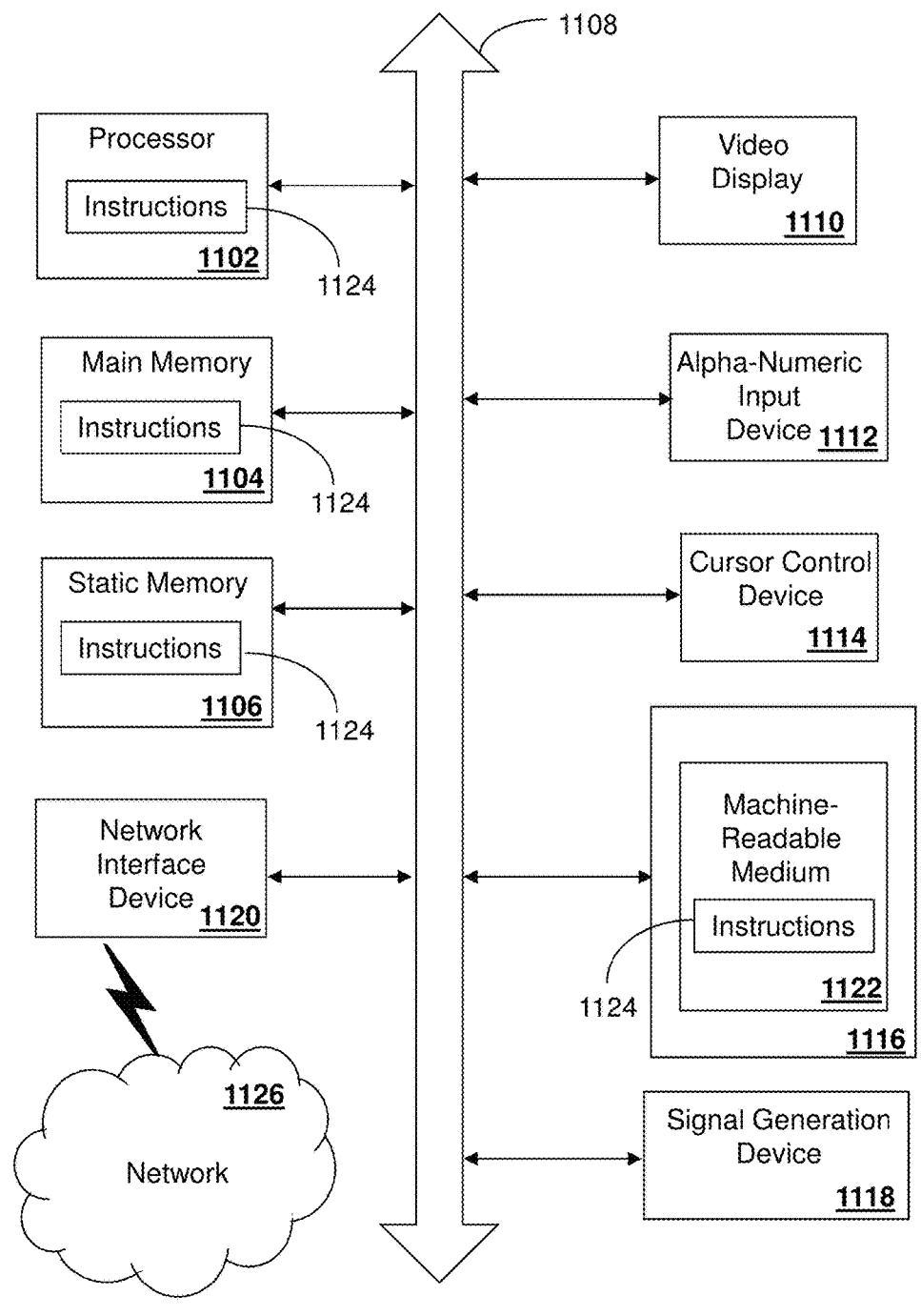
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the server 510, the advertising manager 520, and other devices of FIGS. 1-5. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a processor; and a memory that stores executable instructions that, when executed by the processor, facilitate performance of operations, comprising:
  determining a coverage area associated with an advertising display device, the coverage area having a boundary defined by geographic coordinates;
  monitoring presence and motion of a plurality of communication devices with respect to the coverage area to determine a viewing time and a trajectory within the coverage area for each communication device, wherein the viewing time comprises a period that each of the plurality of communication devices is within the coverage area;
  associating each communication device with a user profile, the user profile comprising demographic data and preference data for a user;
  assigning each user profile a first weighting factor and a second weighting factor based respectively on the viewing time and the trajectory for the associated communication device,
    wherein the first weighting factor continuously decreases as a first function of increasing viewing time from a time that the associated communication device enters the coverage area and while the associated communication device remains within the coverage area, the viewing time corresponding to a time of exposure to an item of advertising content at the advertising display device, the first weighting factor accordingly being greater during an initial exposure period than during a subsequent exposure period, and
    wherein the second weighting factor decreases as a second function of an increasing angle in a range of 0° to 90° between a first direction corresponding to the trajectory for the associated communication device and a second direction from the associated communication device toward a center of a display area of the advertising display device, thereby generating a weighted user profile for each of a plurality of users;
  aggregating a plurality of weighted user profiles corresponding to the plurality of users to generate a time-dependent audience profile for the coverage area that is associated with the an item of advertising content at the advertising display device;
  analyzing the audience profile;
  selecting a new item of advertising content based on the analyzing; and
  transmitting information based on the selecting to an advertising manager to cause display of the new item of advertising content at the advertising display device.

2. The device of claim 1, wherein the assigning further comprises assigning each user profile a third weighting factor based on a type of user activity during the viewing time.

3. The device of claim 2, wherein the item of advertising content corresponds to a product, and wherein the third weighting factor is based at least in part on use or purchase of the product.

4. The device of claim 2, wherein the third weighting factor has a value diminishing with time after the user activity is concluded.

5. The device of claim 1, wherein the first weighting factor for a user profile is adjusted based on a distance from the advertising display device to the associated communication device.

6. The device of claim 1, wherein the first weighting factor for a user profile is adjusted based on historical data regarding movement of the associated communication device with respect to the coverage area.

7. The device of claim 6, wherein the first weighting factor is reduced responsive to the historical data indicating recurring movement into the coverage area.

8. The device of claim 1, wherein the second weighting factor for a user profile is adjusted based on a velocity of the associated communication device with respect to the advertising display device.

9. The device of claim 1, wherein the operations further comprise resetting the first weighting factor to an initial value responsive to an initial display of the new item of advertising content.

10. The device of claim 1, wherein the determining of the coverage area further comprises retrieving geographic coordinates for a geofence associated with the advertising display device.

11. A method comprising:
  determining, by a device comprising a processor, a coverage area associated with an advertising display device, the coverage area having a boundary defined by geographic coordinates;
  monitoring, by the device, presence and motion of a plurality of communication devices with respect to the coverage area to determine a viewing time and a trajectory within the coverage area for each communication device, wherein the viewing time comprises a period that each of the plurality of communication devices is within the coverage area;
  associating, by the device, each communication device with a user profile, the user profile comprising demographic data and preference data for a user;
  assigning, by the device, each user profile a first weighting factor and a second weighting factor based respectively on the viewing time and the trajectory for the associated communication device,
    wherein the first weighting factor continuously decreases as a first function of increasing viewing time from a time that the associated communication device enters the coverage area and while the associated communication device remains within the coverage area, the viewing time corresponding to a time of exposure to an item of advertising content at the advertising display device, the first weighting factor accordingly being greater during an initial exposure period than during a subsequent exposure period, and
    wherein the second weighting factor decreases as a second function of an increasing angle in a range of 0° to 90° between a first direction corresponding to the trajectory for the associated communication device and a second direction from the associated communication device toward a center of a display area of the advertising display device, thereby generating a weighted user profile for each of a plurality of users;
  aggregating, by the device, a plurality of weighted user profiles corresponding to the plurality of users to generate a time-dependent audience profile for the coverage area that is associated with the item of advertising content at the advertising display device;
  analyzing, by the device, the audience profile; and
  selecting, by the device, a new item of advertising content based on the analyzing.

12. The method of claim 11, further comprising transmitting information based on the selecting to an advertising manager to cause display of the new item of advertising content at the advertising display device.

13. The method of claim 12, further comprising resetting the first weighting factor to an initial value responsive to an initial display of the new item of advertising content.

14. The method of claim 11, wherein the assigning further comprises assigning each user profile a third weighting factor based on a type of user activity during the viewing time.

15. The method of claim 11, wherein the first weighting factor for a user profile is adjusted based on historical data regarding movement of the associated communication device with respect to the coverage area.

16. The method of claim 15, wherein the first weighting factor is reduced responsive to the historical data indicating recurring movement into the coverage area.

17. A non-transitory machine-readable medium comprising executable instructions that, when executed by a processing system including a processor, cause performance of operations, comprising:
   determining a coverage area associated with an advertising display device, the coverage area having a boundary defined by geographic coordinates;
   monitoring presence and motion of a plurality of communication devices with respect to the coverage area to determine a viewing time and a trajectory within the coverage area for each communication device, wherein the viewing time comprises a period that each of the plurality of communication devices is within the coverage area;
   associating each communication device with a user profile, the user profile comprising demographic data and preference data for a user;
   assigning each user profile a first weighting factor and a second weighting factor based respectively on the viewing time and the trajectory for the associated communication device, thereby generating a weighted user profile for each of a plurality of users,
   wherein the first weighting factor continuously decreases as a first function of increasing viewing time from a time that the associated communication device enters the coverage area and while the associated communication device remains within the coverage area, the viewing time corresponding to a time of exposure to an item of advertising content at the advertising display device, the first weighting factor accordingly being greater during an initial exposure period than during a subsequent exposure period, and
   wherein the second weighting factor decreases as a second function of an increasing angle in a range of 0° to 90° between a first direction corresponding to the trajectory for the associated communication device and a second direction from the associated communication device toward a center of a display area of the advertising display device;
   aggregating a plurality of weighted user profiles corresponding to the plurality of users to generate a time-dependent audience profile for the coverage area that is associated with an item of advertising content at the advertising display device;
   analyzing the audience profile; and
   selecting a new item of advertising content based on the analyzing.

18. The non-transitory machine-readable medium of claim 17, wherein the operations further comprise resetting the first weighting factor to an initial value responsive to an initial display of the new item of advertising content.

19. The non-transitory machine-readable medium of claim 17, wherein the assigning further comprises assigning each user profile a third weighting factor based on a type of user activity during the viewing time.

20. The non-transitory machine-readable medium of claim 17, wherein the first weighting factor for a user profile is adjusted based on historical data regarding movement of the associated communication device with respect to the coverage area.

* * * * *